US 8,260,156 B2

(12) United States Patent
Qian et al.

(10) Patent No.: US 8,260,156 B2
(45) Date of Patent: *Sep. 4, 2012

(54) ADAPTIVE CROSSING FREQUENCY DOMAIN EQUALIZATION (FDE) IN DIGITAL POLMUX COHERENT SYSTEMS

(75) Inventors: Dayou Qian, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/607,166

(22) Filed: Oct. 28, 2009

(65) Prior Publication Data

US 2010/0142952 A1    Jun. 10, 2010

Related U.S. Application Data

(60) Provisional application No. 61/108,892, filed on Oct. 28, 2008, provisional application No. 61/108,891, filed on Oct. 28, 2008.

(51) Int. Cl.
*H04B 10/06* (2006.01)
*H04B 10/12* (2006.01)
*H04B 10/00* (2006.01)

(52) U.S. Cl. ........ 398/209; 398/202; 398/205; 398/147; 398/158

(58) Field of Classification Search .................. 398/208, 398/209

See application file for complete search history.

(56) References Cited

U.S. PATENT DOCUMENTS

| 7,315,575 | B2* | 1/2008 | Sun et al. ........... 375/229 |
| 7,522,841 | B2* | 4/2009 | Bontu et al. ........... 398/154 |
| 7,603,044 | B1* | 10/2009 | Conroy et al. .......... 398/202 |
| 7,623,797 | B2* | 11/2009 | Crivelli et al. ......... 398/208 |
| 7,627,252 | B2* | 12/2009 | Sun et al. ........... 398/155 |
| 7,636,525 | B1* | 12/2009 | Bontu et al. ........... 398/208 |
| 7,684,712 | B1* | 3/2010 | Roberts et al. ......... 398/208 |
| 7,701,842 | B2* | 4/2010 | Roberts et al. ......... 370/210 |
| 7,769,305 | B1* | 8/2010 | Roberts et al. ......... 398/206 |
| 7,894,728 | B1* | 2/2011 | Sun et al. ........... 398/208 |
| 7,899,340 | B1* | 3/2011 | Bontu et al. ........... 398/209 |
| 2006/0285854 | A1* | 12/2006 | Sun et al. ........... 398/155 |
| 2007/0092260 | A1* | 4/2007 | Bontu et al. ........... 398/152 |
| 2009/0201796 | A1* | 8/2009 | Roberts et al. ......... 370/210 |
| 2009/0232194 | A1* | 9/2009 | Yoshida ........... 375/227 |
| 2009/0245816 | A1* | 10/2009 | Liu et al. ........... 398/208 |
| 2010/0046961 | A1* | 2/2010 | Tanimura et al. ........ 398/159 |
| 2010/0074632 | A1* | 3/2010 | Zhou ............ 398/208 |
| 2010/0092181 | A1* | 4/2010 | Roberts et al. ......... 398/159 |
| 2010/0119241 | A1* | 5/2010 | Yang et al. ........... 398/208 |
| 2010/0196017 | A1* | 8/2010 | Tanimura et al. ........ 398/159 |
| 2010/0329677 | A1* | 12/2010 | Kaneda et al. .......... 398/65 |
| 2010/0329697 | A1* | 12/2010 | Koizumi et al. ......... 398/208 |
| 2011/0064421 | A1* | 3/2011 | Zhang et al. .......... 398/208 |
| 2011/0081150 | A1* | 4/2011 | Li et al. ............ 398/65 |
| 2011/0142449 | A1* | 6/2011 | Xie ............... 398/65 |
| 2011/0150503 | A1* | 6/2011 | Winzer ........... 398/202 |
| 2011/0182582 | A1* | 7/2011 | Yang et al. ........... 398/65 |
| 2011/0200339 | A1* | 8/2011 | Komaki et al. ......... 398/208 |

* cited by examiner

*Primary Examiner* — Kenneth N Vanderpuye
*Assistant Examiner* — Amritbir Sandhu
(74) *Attorney, Agent, or Firm* — Jeffrey Brosemer; Joseph Kolodka

(57) ABSTRACT

A method for the polarization independent frequency domain equalization (FDE) on polarization multiplexing (POLMUX) coherent systems employing an adaptive crossing FDE which advantageously produces CD compensation, PMD compensation and PolDeMux within one functional block of a digital signal processor (DSP).

1 Claim, 10 Drawing Sheets

ADAPTIVE CROSSING FREQUENCY DOMAIN EQUALIZATION (FDE) IN DIGITAL POLMUX COHERENT SYSTEMS

CROSS REFERENCE TO RELATED APPLICATION

This application claims the benefit of U.S. Provisional Patent Application No. 61/108,892 filed Oct. 28, 2008 and U.S. Provisional Patent Application No. 61/108,891 filed Oct. 28, 2008 which are incorporated by reference as if set forth at length herein.

FIELD OF DISCLOSURE

This disclosure relates to the field of optical communications and in particular to method for adaptive crossing frequency domain equalization (FDE) in digital PolMux coherent systems.

BACKGROUND OF DISCLOSURE

With the continual increase in the speed of optical communication systems, polarization multiplexing (PolMux) systems utilizing coherent detection schemes based on digital signal processing (DSP) have been subject of much research and development. As compared with conventional systems, PolMux coherent systems utilize digital signal processing (DSP) techniques and devices to provide a number of receiver functions including—for example—chromatic dispersion (CD) compensation, polarization-mode dispersion (PMD) compensation, polarization de-multiplexing (PolDeMux), frequency offset recovery and phase noise mitigation. These functions—while essential in contemporary systems—still suffer from the absence of an efficient DSP methods.

SUMMARY OF DISCLOSURE

An advance is made in the art according to an aspect of the present disclosure directed to a method for the polarization independent frequency domain equalization (FDE) chromatic dispersion compensation on polarization multiplexing (POLMUX) coherent systems.

An adaptive crossing FDE—according to an aspect of the present disclosure—produces CD compensation, PMD compensation and PolDeMux within one functional block of a digital signal processor (DSP). In sharp contrast, contemporary digital coherent receivers compensate CD and perform PMD compensation and Polarization DeMultiplexing in two independent DSP function blocks, which unfortunately compounds the computing complexity of such systems while requiring ~2× the hardware computing resources.

Advantageously, and according to an aspect of the adaptive crossing FDE of the present disclosure, the CD/PMD compensation and PolDeMux is performed within a single DSP functional block which has only the same computing complexity as a CD compensation only function in a traditional digital coherent receiver.

Operationally, all of the compensation filters and PolDeMux matrix are transformed into the frequency domain so that the time domain convolution operation can be replaced with simple dot multiplication. In addition, the CD compensation filters, PMD compensation filters and PolDeMux matrix are combined into a one-step adaptive crossing frequency domain equalizer to efficiently utilize the intermediate signal between FFT and IFFT.

BRIEF DESCRIPTION OF THE DRAWING

A more complete understanding of the disclosure may be realized by reference to the accompanying drawing in which.

DESCRIPTION OF EMBODIMENTS

Figure 1:
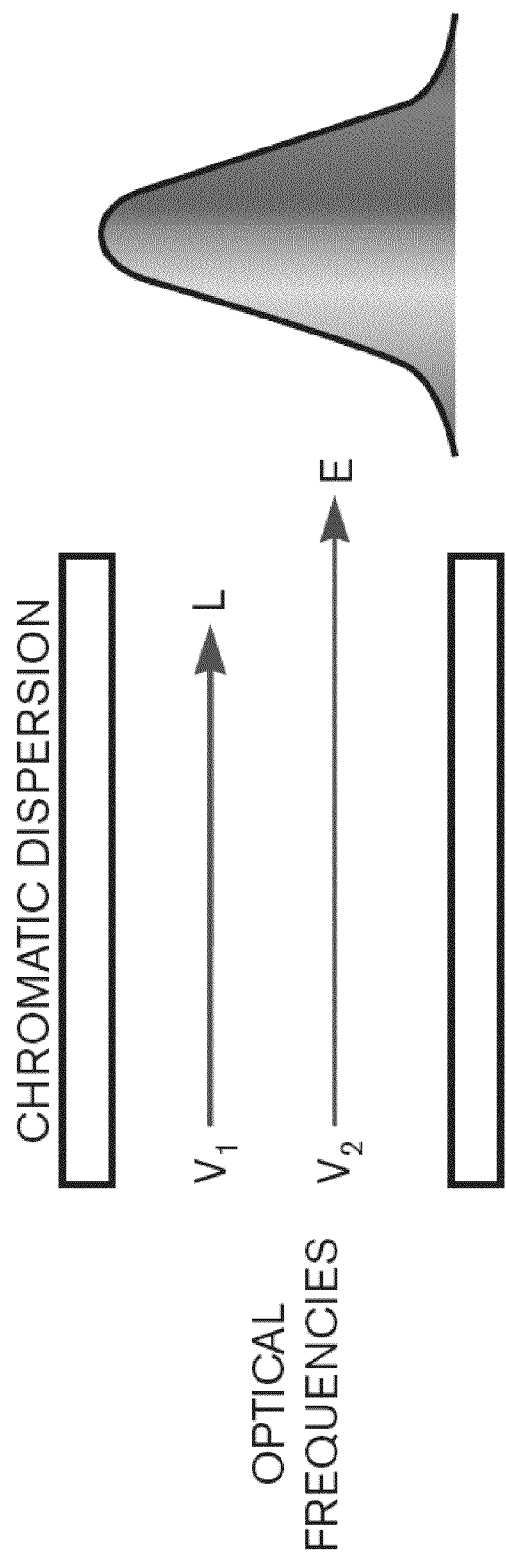
FIG. 1 is a simple graph showing pulse broadening and chromatic dispersion.

The following merely illustrates the principles of the various embodiments. It will thus be appreciated that those skilled in the art will be able to devise various arrangements which, although not explicitly described or shown herein, embody the principles of the embodiments and are included within their spirit and scope.

Furthermore, all examples and conditional language recited herein are principally intended expressly to be only for pedagogical purposes to aid the reader in understanding the principles of the embodiments and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

Unless otherwise explicitly specified herein, the drawings are not drawn to scale.

By way of some additional background, it is noted that chromatic dispersion—the result of physical and waveguide properties—manifests itself as the spreading of a pulse of light as it travels over a distance of optical fiber. As is known, optical lasers output pulses of light having a finite spectrum comprising one or more colors. Generally, the longer the fiber over which a pulse travels, the wider the pulse spreads out (See, e.g., FIG. 1).

Difficulties arise when the energy of a pulse begins to interfere with that of an adjacent pulse. This interference causes inter-symbol interference (ISI) in the electrical domain which—in turn—causes errors in transmission systems at a receiver side of a transmission link which cannot easily distinguish received symbols because they are no longer at ideal levels. Depending on the particular type of optical fiber used in a transmission system, such pulse spreading may cross several unit intervals (UIs). Generally, a dispersion of one UI means that adjacent symbols within the same symbol string begin to interfere with each other.

Single Mode Optical Fiber (SMF) as used in contemporary transmission systems typically exhibits a dispersion slope of about 17 psec/nm at 1550 nm, or approximately the operating range of a long-haul transmission system. Typically, manufacturers quantify chromatic dispersion by the distance light travels along the optical fiber. A pulse having a center frequency at 1550 nm transmitting over a fiber span of 140 km would experience a total chromatic dispersion of approximately 2400 psec/nm, which is substantially equal to an anticipated long-reach standard.

Figure 2:
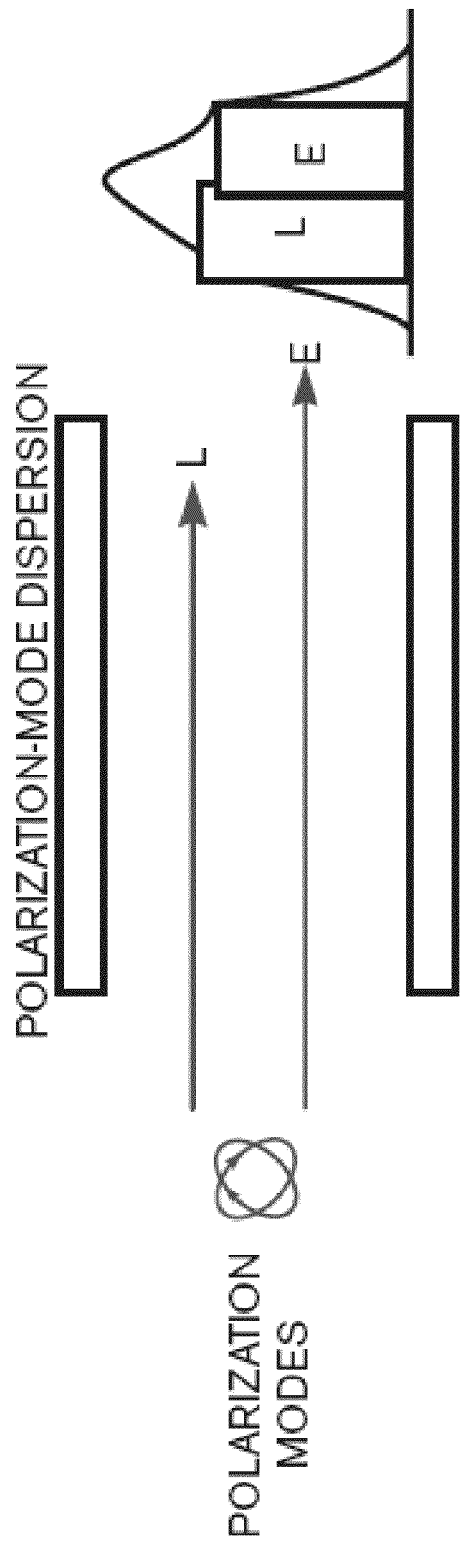
FIG. 2 is a simple graph showing polarization mode dispersion.

Polarization mode dispersion (PMD)—frequently a concern in SMF applications—is a phenomenon in which a single pulse appears as multiple pulses further along the optical fiber (see, e.g., FIG. 2). As is known, optical fiber supports two perpendicular polarizations planes and "ideal" fiber would transport both polarizations to arrive at a receiver side at the same time—thereby appearing at the receiver as a single pulse. However, fiber is neither perfectly round nor stress-free which leads to phase shifting of the pulse. Fortunately, designers of optical systems may compensate for PMD using standard receivers in those applications requiring less than 80 km spans. As span distance increases however, the effects of PMD are statistical and therefore complex to measure.

If compressive forces or kinks have damaged the optical fiber—for example—system performance degrades much more quickly. By way of example, consider the fact that a single kink may cause two components of light to travel at 90-degrees relative to one another. For this reason, the condition (kinks, etc) of the fiber may have a more pronounced effect on signal integrity than the length of the span.

Figure 3:
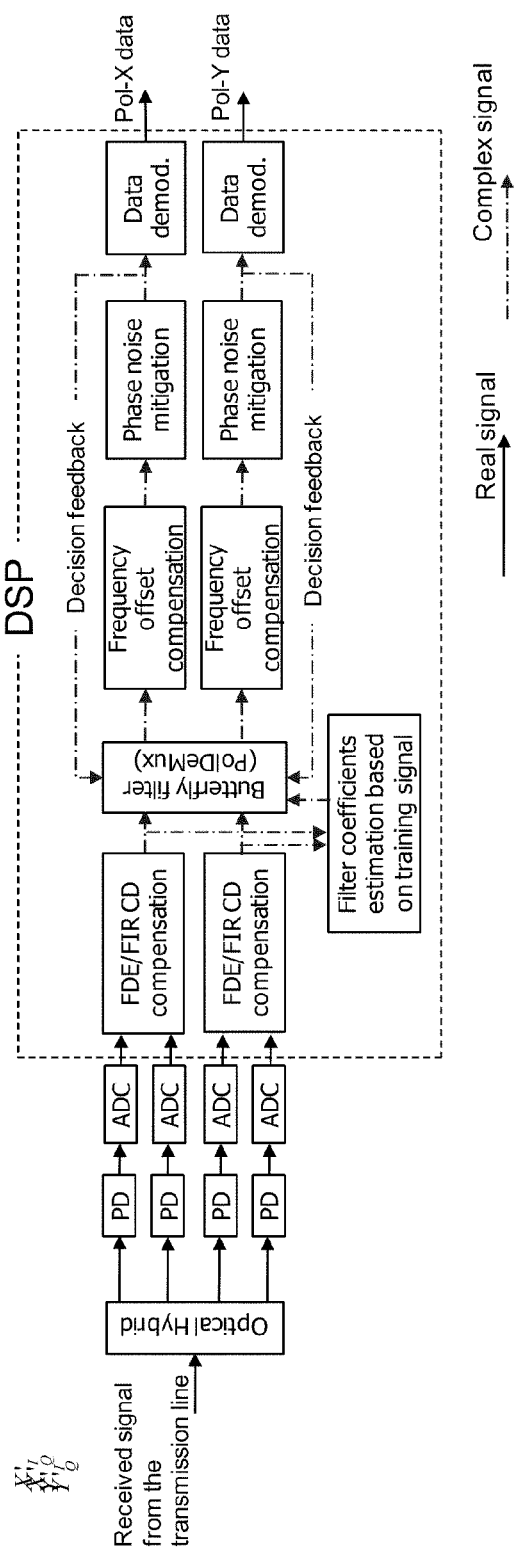
FIG. 3 is a schematic block diagram of a representative digital coherent receiver.

Turning now to FIG. 3, there is shown a schematic block diagram depicting a digital coherent receiver architecture exhibiting polarization independent FDE-based CD compensation in PolMux coherent systems. As shown therein, a received signal is applied to an optical hybrid and four output optical signals ($X'_I, X'_Q, Y'_I, Y'_Q$) are generated where X' and Y' are two random polarizations orthogonal to each other and I/Q are two orthogonal phases. These four output optical signals are detected by photo-diodes and then digitized by Analog/Digital Converter.

I/Q signals having the same polarization are directed through FDE/FIR CD compensation to compensate CD. The signals having different polarizations are processed separately and independently by the FDE. Two output complex signals from the FDE/FIR CD compensation block are jointly processed in the Butterfly filter (PolDeMux) to recover the signals on two original polarizations using either training signals or blind algorithms.

After the PolDeMux, frequency offset compensation, phase noise mitigation and data demodulation techniques are performed on the recovered signals for the two original polarizations.

While not specifically shown in this figure, within the FDE/FIR CD compensation block, the input I/Q signals are converted from serial to parallel in a frame by frame manner. The signal frame size is M−N+1, where M is the FFT size, and N is the required tap number for the CD compensation using FIR algorithm. After serial-to-parallel conversion, the (N−1) zeros are added at the end of the signal frame (size M−N+1) to form a FFT frame matching the FFT size M. The FFT frame is transformed into frequency domain by the FFT function.

Equalization coefficients are pre-calculated based on the transmission distance and optical fiber characters. The frequency domain signals are multiplied with the corresponding coefficients and subsequently an inverse FFT and parallel-to-serial conversion performed to convert the signals back into the time domain. Next the first N−1 output time domain signals from this frame are be added to the last N−1 output signals from the previous frame thereby producing the final output signals. As may be appreciated, the last N−1 signals from this frame are kept until the overlap with the next frame output.

Advantageously and as can now be readily appreciated, our inventive FDE algorithm does not rely on the polarizations of the optical signals. In addition, it does not need CP or pilots. Finally, it does not need the frequency offset compensation done before either. The FFT size and the input signal frame size are designed so that the output signals from each frame can be overlapped with the previous frame to generate continuous output signals.

As may be further appreciated and according to an aspect of the present disclosure, the time domain signals are converted to frequency domain signals so that the time domain convolution can be done as simple multiplications in frequency domain. Then the frequency domain signals are converted back to time domain. The input signal size and FFT size have are designed so that the output signals can be continuous with some overlap between two successive frames.

As coherent receivers and high speed ADCs have become available, CD compensation using DSP techniques and devices has become practical. Three notable DSP techniques have been proposed for designs of a digital equalizer to realize CD compensation. The three are finite impulse response (FIR) filter, infinite impulse response (IIR) filter and frequency domain equalization (FDE).

Figure 4:
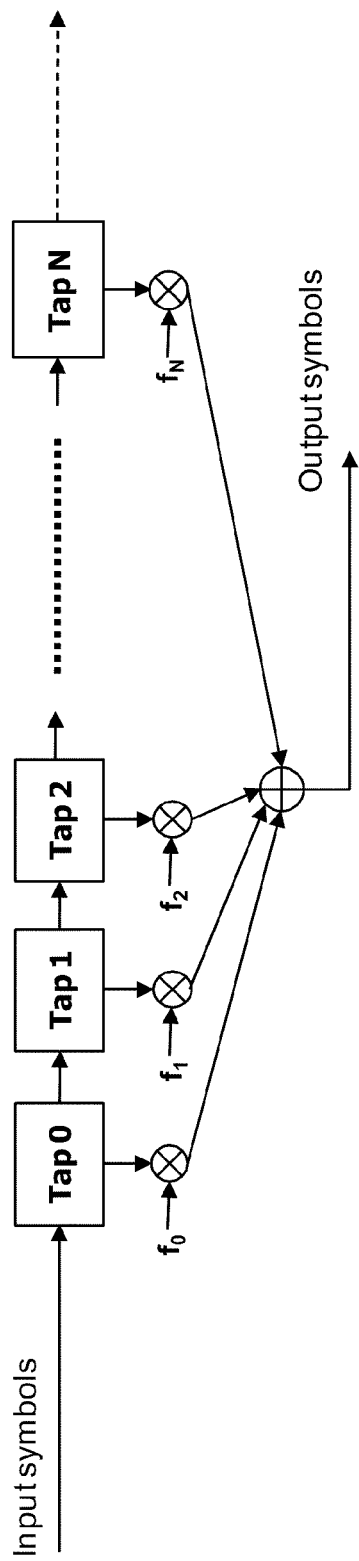
FIG. 4 is a schematic block diagram of a representative FIR filter.
Figure 5:
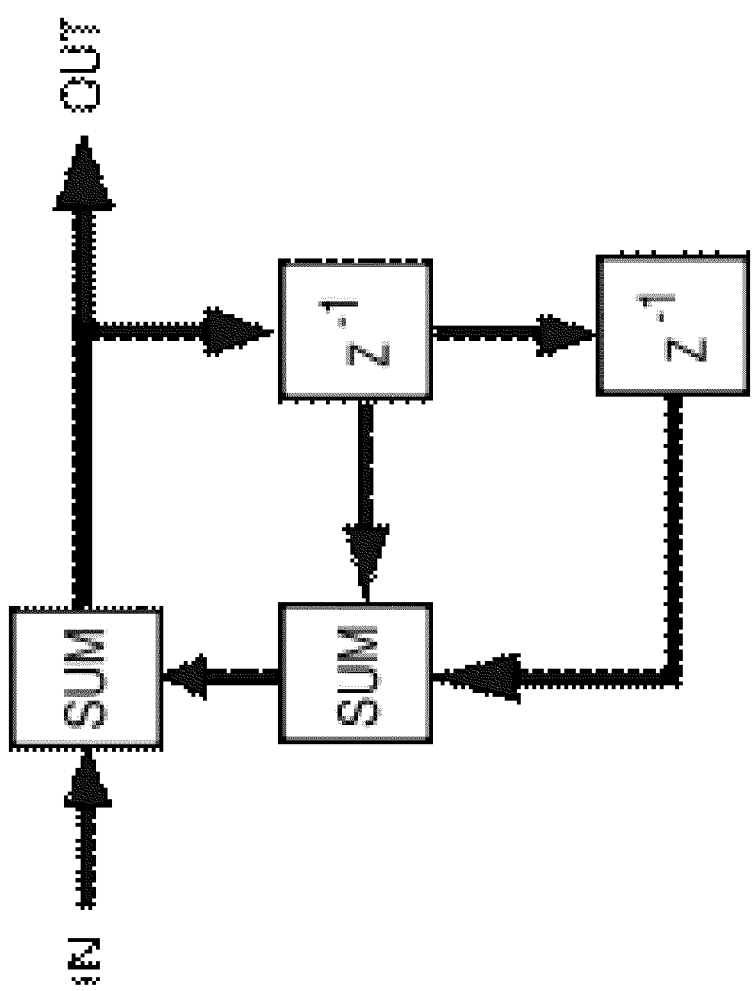
FIG. 5 is a schematic block diagram of a representative IIR filter.

FIG. 4 shows a schematic block diagram of a FIR filter. As is known by those skilled in the art, the impulse response of such a filter is "finite" because there is no feedback in the filter. As may be appreciated, such an FIR filter performs convolution of filter coefficients and an input signal. More generally, FIR filters comprise a sample delay line and a set of coefficients. An FIR filter such as that shown exhibits a number of useful properties, namely:

- FIR filters are inherently stable. This is due to the fact that all the poles are located at the origin and thus are located within the unit circle.
- FIR filters require no feedback. This means that any rounding errors are not compounded by summed iterations. The same relative error occurs in each calculation. This also makes implementation simpler.
- FIR filters can be designed to be linear phase, which means the phase change is proportional to the frequency. This is usually desired for phase-sensitive applications, for example crossover filters, and mastering, where transparent filtering is adequate.

Of course FIR filters have disadvantages as well. One such disadvantage of FIR filters is that considerably more computation power is required to implement same. By way of an example, for effective CD compensation an FIR filter may require hundreds of taps which is simply not practical for contemporary high speed signal processing chips.

In sharp contrast, infinite impulse response (IIR) filters exhibit a response function that is non-zero over an infinite length of time. A simplified block diagram of such an IIR filter is shown in FIG. 4. The $Z^{-1}$ block is a unit of delay. The coefficients and number of feedback/feedforward paths are implementation dependent. And while an IIR filter can significantly reduce the number of taps as compared to the FIR filter by using the feedback signals, unfortunately its stability is very poor and as a result such a filter may pose a risk in production environments that require deterministic performance.

Figure 6:
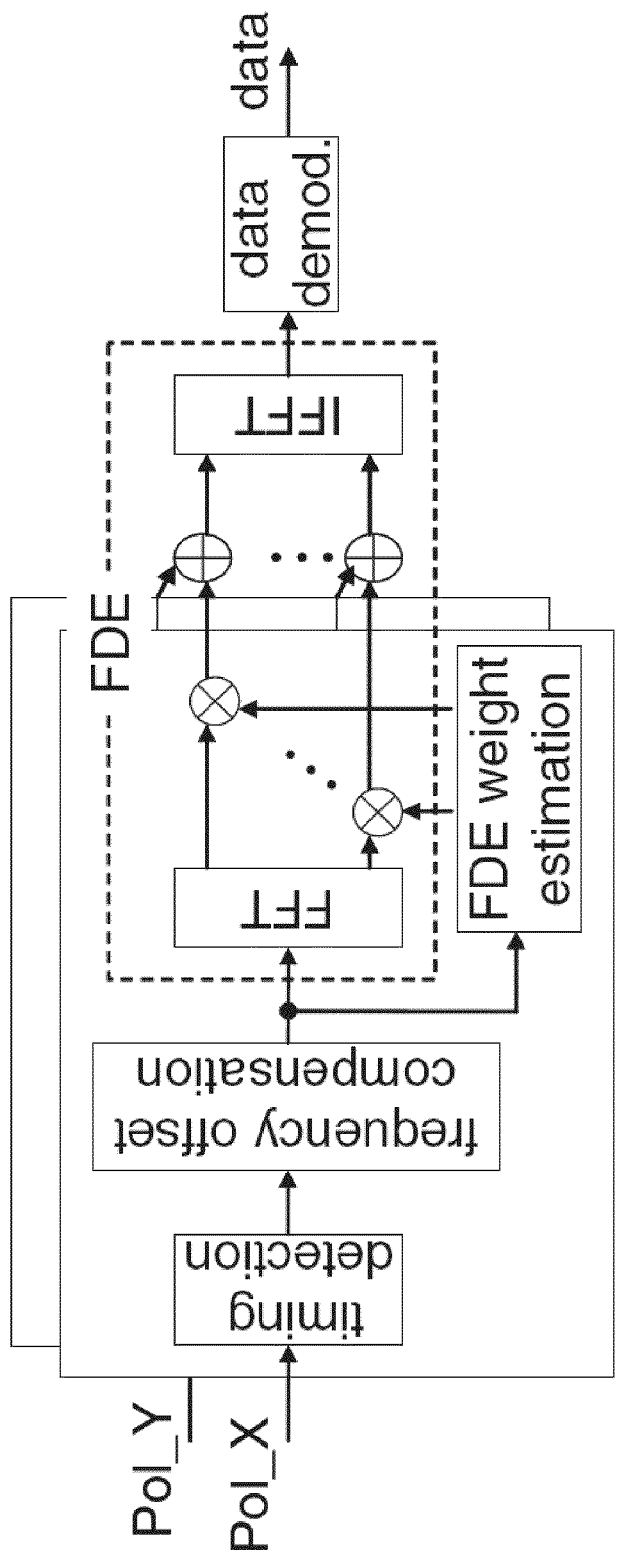
FIG. 6 is a schematic block diagram showing FDE for a single polarization transmission system with CP and pilots.

Advantageously FDE may perform CD compensation in a single polarization transmission system. The FDE method requires cyclic prefix (CP) and pilot signals inserted to the data signal at the transmitter, and time detection (frame synchronization) and frequency offset compensation before the FDE at the receiver. The FDE coefficients also need to be estimated and updated using pilot signals. As can be appreciated, the CP and pilot will increase the complexity of both transmitter and receiver because of the signal insertion and frame synchronization. The redundancy from them also reduces the transmission efficiency. In addition, because the FDE weights are estimated based on the pilots, the frequency offset compensation has to be done before the FDE. And due to the limitation of the PolDeMux methods, PolDeMux only can work if the CD has been fully compensated. Meanwhile FDE CD compensation methods require the frequency offset compensation done before the PolDeMux which would make some simple frequency offset compensation algorithm unavailable and the computing complexity much higher. A schematic block diagram showing FDE for a single polarization transmission system with CP and pilots is shown in FIG. 6.

Figure 7:
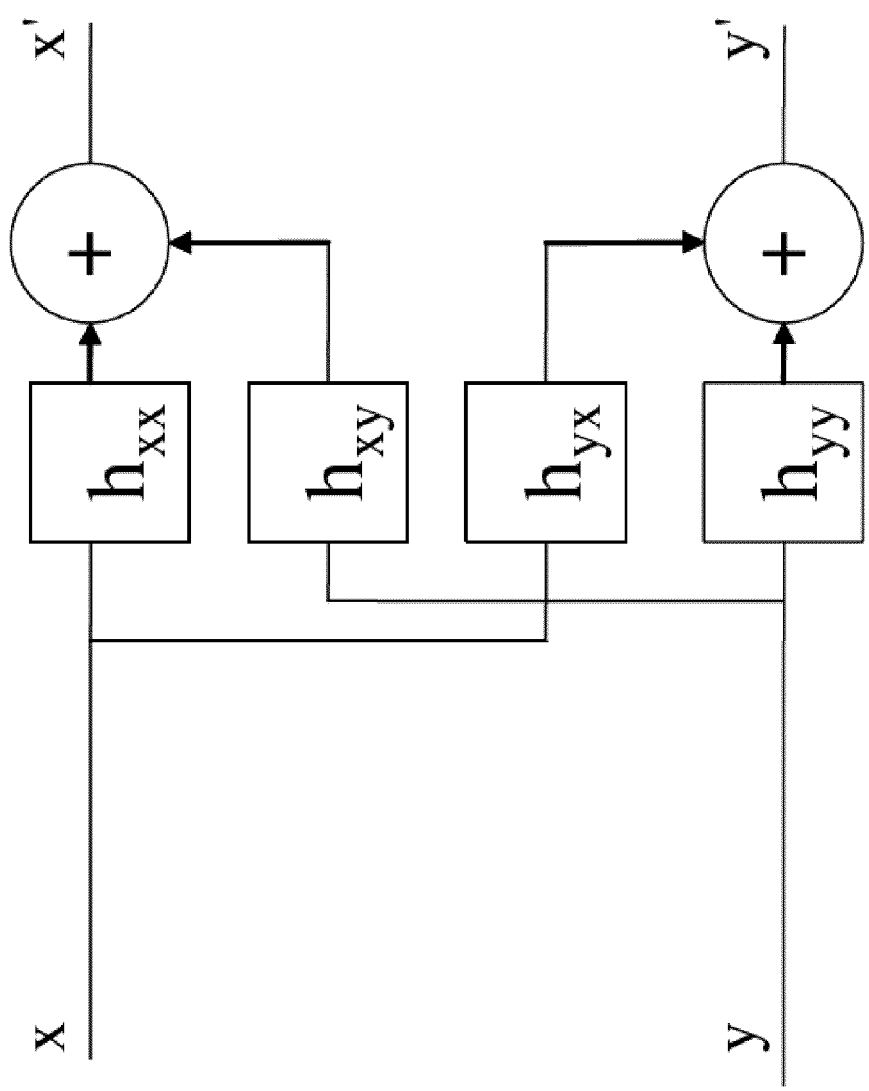
FIG. 7 is a schematic block diagram showing butterfly filters for PMD compensation and PolDeMux.

Currently, PMD compensation is done with adaptive butterfly FIR filters such as that as shown in FIG. 7. As shown therein, there are four filters with tap number N designated as $\{h_{xx}, h_{xy}, h_{yx}, h_{yy}\}$. Advantageously, these filters can also do polarization de-multiplexing at the same time as PMD compensation. More particularly, input signals X and Y exhibit two polarization directions randomly selected by a polarization beam splitter (PBS) in the optical hybrid. The output signals X' and Y' are the recovered signals at two original transmitting polarization directions.

As may now be appreciated, there are three general options to consider in the design the butterfly filter. They are training signal mode, blind algorithm mode and decision feedback mode.

With these principles in place, an aspect of the present disclosure is an adaptive crossing FDE architecture that performs CD compensation, PMD compensation and PolDeMux within one function block of a digital signal processor (DSP). As may be appreciated, our inventive architecture may significantly reduce the amount of computing work and increase the usage efficiency of the intermediate processing signal outputs so that the overall DSP system complexity can be reduced (by at least 50%).

Operationally, continuously received signals are segmented into frames. The FFT size is designed to be larger than the length of a signal frame. Such overhead is helpful to smoothly connect output signals from successive frames. A crossing processing employing adaptive coefficients is added between the FFT and an IFFT. The intermediate crossing processing recovers the polarization information and the adaptive coefficients compensate the PMD.

Advantageously, our adaptive crossing FDE architecture can significantly reduced the DSP implementation complexity so that the full CD compensation, PMD compensation and polDeMux can be done by a single DSP function block.

Figure 8:
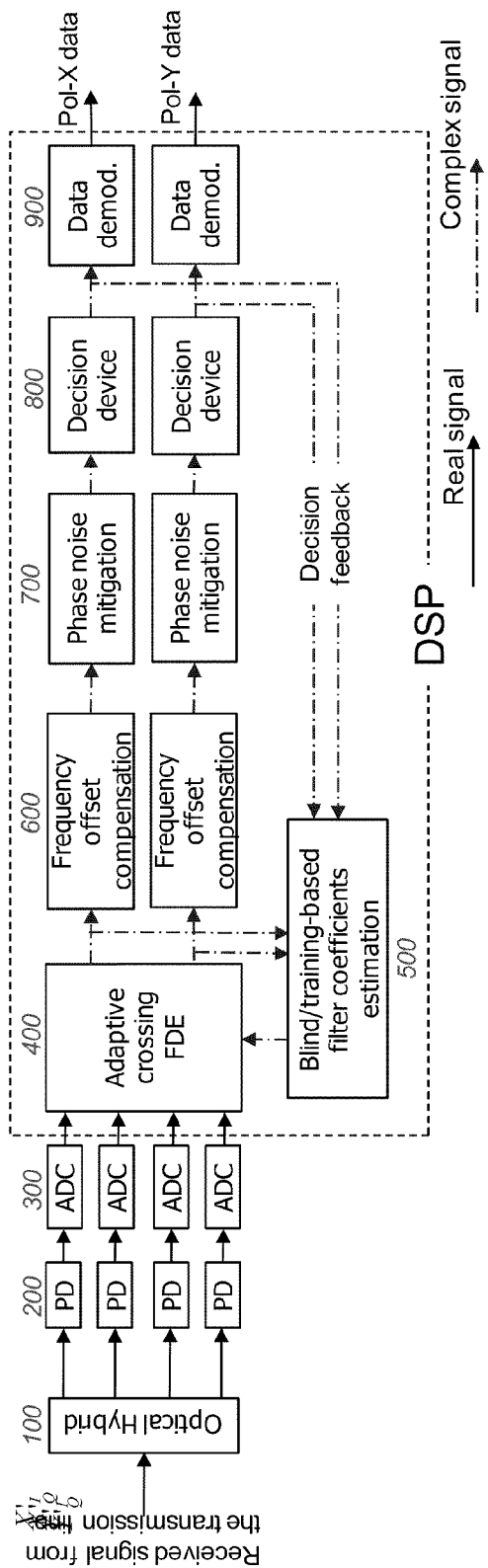
FIG. 8 is a schematic block diagram showing adaptive crossing FDE architecture for digital PolMux coherent receiver.

FIG. 8 is a schematic block diagram which shows the architecture of an adaptive crossing FDE function for digital PolMux coherent receiver according to an aspect of the present disclosure. With reference now to that FIG. 8, there it may be observed that a received signal from a transmission line—for example—is passed through optical hybrid (100) thereby generating four output signals ($X'_I, X'_Q, Y'_I, Y'_Q$) where X' and Y' represent two random polarizations orthogonal to each other and I/Q represent two orthogonal phases.

The four output optical signals ($X'_I, X'_Q, Y'_I, Y'_Q$) are detected by photo-diodes (200) and digitized by the ADC (300). The I/Q signals of both polarizations are sent through adaptive crossing FDE (400) wherein CD and PMD are compensated and the signals on the two original polarizations are recovered. In block 500, the initial filter coefficients are estimated (500) by either a training signal or a blind estimation algorithm. Once the bit error rate (BER) becomes lower than a certain threshold, a decision feedback algorithm can be activated to achieve better estimation performance without increasing the overhead and system complexity.

After the adaptive crossing FDE (400), frequency offset compensation (600), phase noise mitigation (700), decision device (800) and data demodulation (900) is performed thereby recovering signals exhibiting two original polarizations. Advantageously, our inventive adaptive crossing FDE (400) algorithm is independent from the frequency offset, so the frequency offset compensation (600) can be processed either before or after the adaptive crossing FDE (400).

Figure 9:
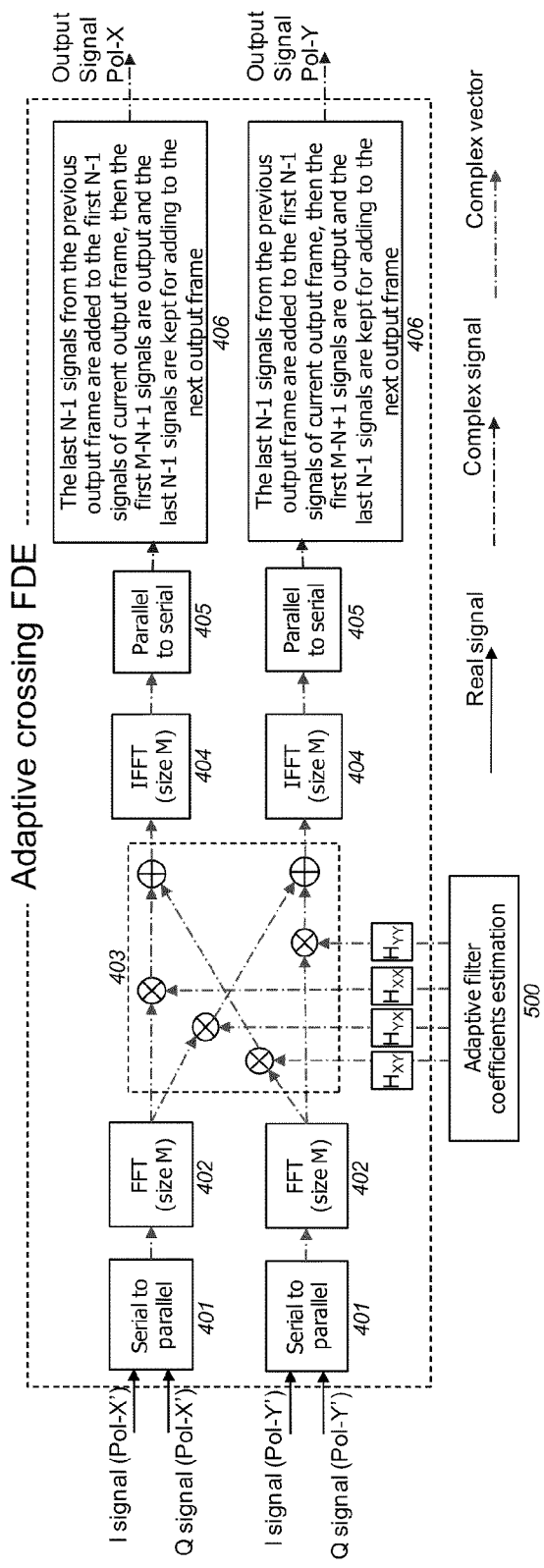
FIG. 9 is a schematic block diagram showing adaptive crossing FDE functions.

With reference now to FIG. 9, in the adaptive crossing FDE function (400), the input I/Q signals of both polarizations X' and Y' are converted from serial to parallel (401) in a frame by frame manner. As implemented, the signal frame size is M−N+1, where M is the FFT size, N is the required tap number for the CD compensation using FIR algorithm. After serial-to-parallel conversion, (N−1) zeros are added at the end of the signal frame (size M−N+1) to form a FFT frame matching the FFT size M. The FFT frame is transformed into frequency domain by the FFT function (402).

The crossing filter coefficients are estimated and updated based on training signals, blind algorithm or decision feedback signals (500). The frequency domain signals from both polarizations X' and Y' are multiplied with corresponding coefficient vector $\{H_{XX}, H_{XY}, H_{YX}, H_{YY}\}$ and added within crossing processing step (403). The crossing process output performs the IFFT (404) and parallel-to-serial conversion (405) to be converted back to the time domain. For both outputs, the last N−1 output signals from the previous frame are added to the first N−1 output time domain signals from this frame (406). Then the first M−N+1 signals are output to the next function. And the last N−1 signals from this frame would be kept for adding to the next frame output.

Figure 10:
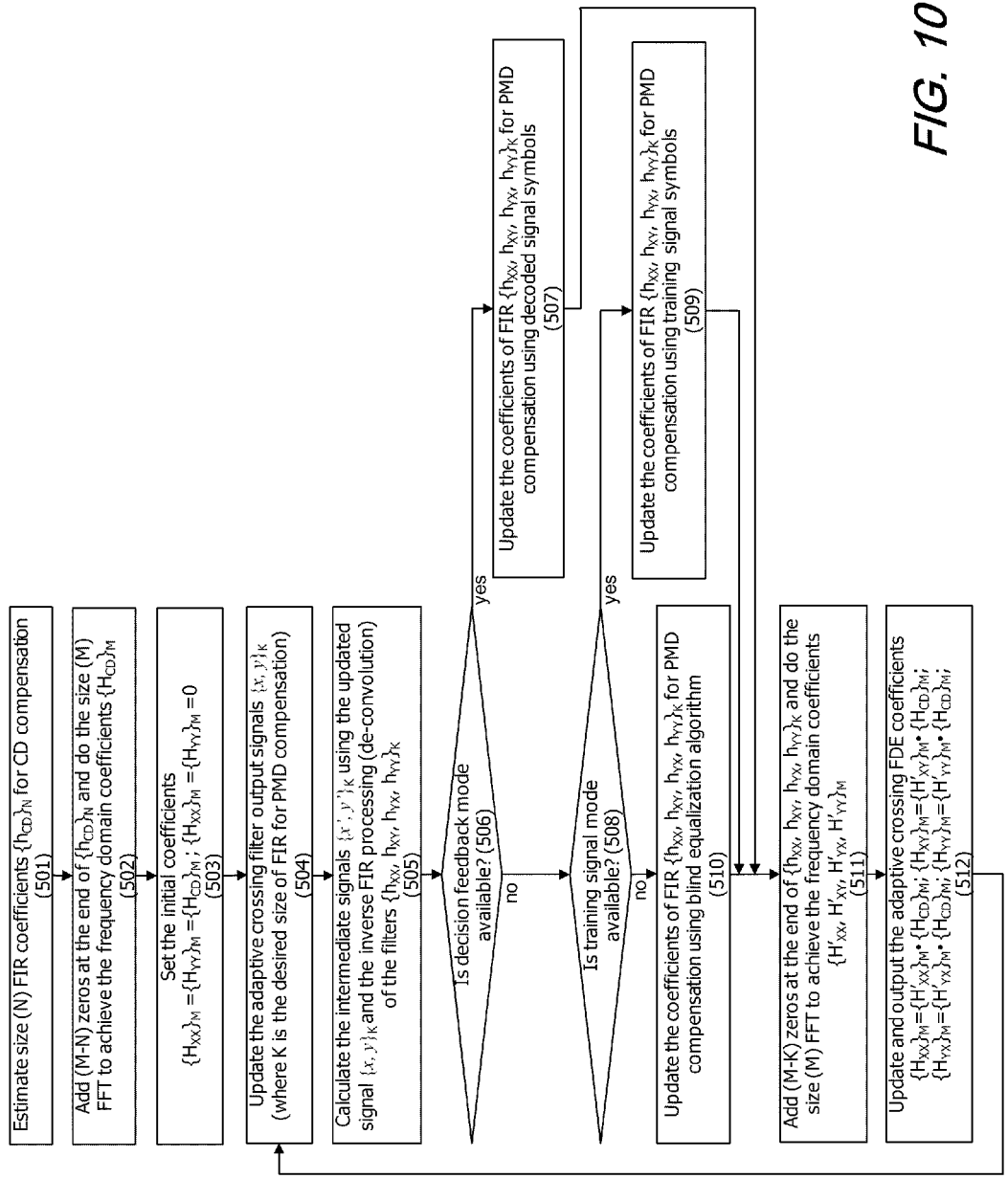
FIG. 10 is a schematic flow diagram showing the steps associated with adaptive crossing FDE coefficient estimation according to an aspect of the present disclosure.

FIG. 10 is a block flow diagram showing the procedure associated with the adaptive crossing FDE coefficient estimation according to an aspect of the present disclosure. The adaptive filter coefficients estimation (500) involves two steps. The first step is to estimate the fixed coefficients for CD compensation (501~502) based on the transmission length and fiber characters. The second step is to estimate the adaptive coefficients for the PMD compensation and PolDeMux periodically (503~511) using the output signal symbols of the adaptive crossing FDE (400). Finally, two compensation filters are combined (512) to update the output coefficients. Because intermediate signal symbols after CD compensation but before PMD compensation and PolDeMux are required to estimate the filter coefficients $\{H'_{XX}, H'_{XY}, H'_{YX}, H'_{YY}\}_M$, the de-convolution of the crossing FIR filters $\{h_{XX}, h_{XY}, h_{YX}, h_{YY}\}_K$ is used (505). Three estimation algorithms are available including blind equalization algorithm (510), training signal (509) and decision feedback (507).

Advantageously, and as should now be apparent to those skilled in the art, our adaptive crossing FDE algorithm can produce CD compensation, PMD compensation and PolDeMux within one DSP functional block. All of the compensation filters and PolDeMux matrix are transformed into the frequency domain so that the time domain convolution operation can be replaced with simple dot multiplication. In addition, the CD compensation filters, PMD compensation filters and PolDeMux matrix are combined into a one-step adaptive crossing frequency domain equalizer to efficiently utilize the intermediate signal between FFT and IFFT.

As may be further appreciated by those skilled in the art, one important aspect of the present disclosure is the estimation of the filter coefficients for the crossing FDE. In addition, the CD compensation filters have fixed coefficients which can be pre-calculated during the system initialization. The PMD compensation filters and PolDeMux matrix need to be updated periodically. And all those filters and matrix need to be combined to a butterfly frequency domain filters to realize the crossing FDE function.

The traditional digital coherent receiver needs compensate CD and do PMD compensation and the PolDeMux in two independent DSP function blocks, which have the same level computing complexity. Meanwhile, as much as twice computing resources are required in the hardware implementation. Using our inventive adaptive crossing FDE solution, the CD/PMD compensation and PolDeMux can be done within one DSP function block which only requires the same computing complexity as the CD compensation only function in the traditional digital coherent receiver.

At this point, while we have discussed and described the invention using some specific examples, those skilled in the art will recognize that our teachings are not so limited. Accordingly, the invention should be only limited by the scope of the claims attached hereto.

The invention claimed is:

1. A method for providing adaptive crossing frequency domain equalization chromatic dispersion compensation, polarization mode dispersion compensation and polarization demultiplexing of a polarization multiplexed (PolMux) optical signal comprising the steps of:

applying the PolMux optical signal to an optical hybrid such that four output signals $X'_I, X'_Q, Y'_I, Y'_Q$ are produced wherein X' and Y' represent two random polarizations orthogonal to one another and I and Q represent two orthogonal phases;

generating four digital electrical signals from the four output signals;

applying the four digital electrical signals to a digital signal processor wherein the following steps are performed:

performing an adaptive crossing frequency domain equalization of the four digital electrical signals that have any chromatic dispersion and polarization mode dispersion compensated, thereby producing two compensated complex signals;

compensating for any frequency offset exhibited by the two compensated signals;

mitigating any noise exhibited by the two frequency offset compensated signals; and demodulating X and Y data from the two complex signals such that two signals Pol-X data and Pol-Y data are produced; and estimating filter coefficients using a blind/training based methodology.

* * * * *